United States Patent
Zheng

(10) Patent No.: US 11,664,722 B2
(45) Date of Patent: May 30, 2023

(54) TECHNOLOGIES FOR CONTROLLING AC-TO-DC CONVERTERS

(71) Applicant: ABB Power Electronics Inc., Plano, TX (US)

(72) Inventor: Sanbao Zheng, Frisco, TX (US)

(73) Assignee: ABB Power Electronics Inc., Plano, TX (US)

( * ) Notice: Subject to any disclaimer, the term of this patent is extended or adjusted under 35 U.S.C. 154(b) by 177 days.

(21) Appl. No.: 16/705,209

(22) Filed: Dec. 5, 2019

(65) Prior Publication Data

US 2021/0175795 A1  Jun. 10, 2021

(51) Int. Cl.
*H02M 7/06* (2006.01)
*H02M 1/42* (2007.01)
*H02M 3/335* (2006.01)
*H02M 1/00* (2006.01)

(52) U.S. Cl.
CPC ....... *H02M 1/4216* (2013.01); *H02M 3/3353* (2013.01); *H02M 7/06* (2013.01); *H02M 1/0025* (2021.05)

(58) Field of Classification Search
CPC .... H02M 1/4216; H02M 3/3353; H02M 7/06; H02M 1/0025; H02M 3/156; H02M 3/158; H02M 3/1588; H02M 3/155; H02M 3/1582; H02M 3/157; H02M 3/1563; H02M 3/1584; H02M 2001/0012; H02M 2001/0009; H02M 2001/385

See application file for complete search history.

(56) References Cited

U.S. PATENT DOCUMENTS

| | | | | |
|---|---|---|---|---|
| 6,677,740 B1* | 1/2004 | Chen | ..................... | H02M 7/539 323/303 |
| 7,629,836 B2* | 12/2009 | Kull | ......................... | H02J 3/01 327/100 |
| 7,952,892 B2* | 5/2011 | Orr | ........................ | H02M 3/335 363/16 |
| 2003/0173938 A1* | 9/2003 | Trainer | ............... | H02M 1/4216 323/205 |
| 2011/0227418 A1* | 9/2011 | Pyboyina | ................ | H02J 9/062 307/75 |
| 2014/0145693 A1* | 5/2014 | Lee | ....................... | H02M 3/156 323/271 |
| 2019/0348903 A1* | 11/2019 | Yamada | ................ | H02M 7/219 |

FOREIGN PATENT DOCUMENTS

EP  0660498  3/2003

OTHER PUBLICATIONS

Johan Kolar et al., "A Novel Three-Phase Utility Interface Minimizing Line Current Harmonics of High-Power Telecommunications Rectifier Modules," IEEE Trans. Ind. Elec. 44, 456 (1997).

* cited by examiner

*Primary Examiner* — Bryan R Perez
(74) *Attorney, Agent, or Firm* — Armstrong Teasdale LLP

(57) ABSTRACT

Technologies for controlling AC-to-DC converters are disclosed. In one illustrative embodiment, a controller of an AC-to-DC converter measures two voltage levels of a split voltage bus of a power factor correction (PFC) circuit. The controller controls current drawn from the positive and negative terminals of the PFC circuit by a DC-to-DC converter. By controlling the current drawn from the two terminals, the controller can control the voltages on the terminals to be equal (but opposite).

20 Claims, 6 Drawing Sheets

TECHNOLOGIES FOR CONTROLLING AC-TO-DC CONVERTERS

TECHNICAL FIELD

The present disclosure relates to technologies for controlling alternating current (AC) to direct current (DC) converters.

BACKGROUND

AC-to-DC converters are used in many applications such as power supplies. Simple converters such as bridge rectifiers can create a DC signal from an AC signal but may lead to a noisy DC signal, a low power factor, and high total harmonic distortion on the AC signal.

In order to avoid these effects, a power factor correction (PFC) circuit can be used. A PFC circuit can draw an average current from an AC source that is in phase with the voltage of the AC source. A PFC circuit can provide a multilevel output, such as both a positive DC and negative DC voltage relative to ground, but a multilevel output can lead to additional problems, such as additional harmonic distortion.

SUMMARY

According to one aspect of the disclosure, an alternating current (AC) to direct current (DC) converter comprising a power factor correction (PFC) circuit comprising a positive DC voltage terminal, a center DC voltage terminal, and a negative DC voltage terminal; a DC-to-DC converter; and a controller configured to determine an indication of a voltage difference between (i) a voltage of the positive DC voltage terminal relative to the center DC voltage terminal and (ii) a voltage of the center DC voltage terminal relative to the negative DC voltage terminal; determine, based on the indication of the voltage difference, a control signal to control a current draw from the positive DC voltage terminal or the negative DC voltage terminal by the DC-to-DC converter; and provide the control signal to the DC-to-DC converter to control the current draw from the positive DC voltage terminal or the negative DC voltage terminal by the DC-to-DC converter.

In some embodiments, to determine the control signal comprises to (i) determine, based on the indication of the voltage difference, a first control signal to control a current draw from the positive DC voltage terminal and (ii) determine, based on the indication of the voltage difference, a second control signal to control a current draw from the negative DC voltage terminal, and wherein to provide the control signal comprises to (i) provide the first control signal to the DC-to-DC converter to control the current draw from the positive DC voltage terminal and (ii) provide the second control signal to the DC-to-DC converter to control the current draw from the negative DC voltage terminal.

In some embodiments, if the indication of the voltage difference indicates that the voltage of the positive DC voltage terminal relative to the center DC voltage terminal is greater than the voltage of the center DC voltage terminal relative to the negative DC voltage terminal, the first control signal causes the current draw from the positive DC voltage terminal to decrease and the second control signal causes the current draw from the negative DC voltage terminal to increase, and if the indication of the voltage difference indicates that the voltage of the positive DC voltage terminal relative to the center DC voltage terminal is less than the voltage of the center DC voltage terminal relative to the negative DC voltage terminal, the first control signal causes the current draw from the positive DC voltage terminal to increase and the second control signal causes the current draw from the negative DC voltage terminal to decrease.

In some embodiments, the DC-to-DC converter comprises a flyback converter.

In some embodiments, the DC-to-DC converter comprises an isolated DC-to-DC converter.

In some embodiments, to determine the control signal comprises to determine the control signal with use of a proportional-integral-derivative (PID) controller.

In some embodiments, to provide the control signal to the DC-to-DC converter causes the voltage difference to decrease.

In some embodiments, an AC input to the AC-to-DC converter is a three-phase AC input.

In some embodiments, the PFC circuit further comprises a PFC controller to control a voltage difference between the positive DC voltage terminal and the negative DC voltage terminal, and wherein the PFC circuit does not include a controller to control a voltage difference between the positive DC voltage terminal and the center DC voltage terminal.

According to one aspect of the disclosure, a method for controlling an alternating current (AC) to direct current (DC) converter, the method comprising determining, by a controller of the AC-to-DC converter, an indication of a voltage difference between (i) a voltage of a positive DC voltage terminal of the AC-to-DC converter relative to a center DC voltage terminal of the AC-to-DC converter and (ii) a voltage of the center DC voltage terminal relative to a negative DC voltage terminal of the AC-to-DC converter; determining, by the controller and based on the indication of the voltage difference, a control signal to control a current draw from the positive DC voltage terminal or the negative DC voltage terminal by a DC-to-DC converter; and providing, by the controller, the control signal to the DC-to-DC converter to control the current draw from the positive DC voltage terminal or the negative DC voltage terminal by the DC-to-DC converter.

In some embodiments, determining the control signal comprises (i) determining, by the controller and based on the indication of the voltage difference, a first control signal to control a current draw from the positive DC voltage terminal and (ii) determining, by the controller and based on the indication of the voltage difference, a second control signal to control a current draw from the negative DC voltage terminal, and wherein providing the control signal comprises (i) providing, by the controller, the first control signal to the DC-to-DC converter to control the current draw from the positive DC voltage terminal and (ii) providing, by the controller, the second control signal to the DC-to-DC converter to control the current draw from the negative DC voltage terminal.

In some embodiments, if the indication of the voltage difference indicates that the voltage of the positive DC voltage terminal relative to the center DC voltage terminal is greater than the voltage of the center DC voltage terminal relative to the negative DC voltage terminal, the first control signal causes the current draw from the positive DC voltage terminal to decrease and the second control signal causes the current draw from the negative DC voltage terminal to increase, and if the indication of the voltage difference indicates that the voltage of the positive DC voltage terminal relative to the center DC voltage terminal is less than the voltage of the center DC voltage terminal relative to the negative DC voltage terminal, the first control signal causes the current draw from the positive DC voltage terminal to increase and the second control signal causes the current draw from the negative DC voltage terminal to decrease.

In some embodiments, determining the control signal comprises determining the control signal with use of a proportional-integral-derivative (PID) controller.

In some embodiments, providing the control signal to the DC-to-DC converter causes the voltage difference to decrease.

In some embodiments, the AC-to-DC converter comprises a power factor correction (PFC) circuit, and wherein the PFC circuit comprises the positive DC voltage terminal, the center DC voltage terminal, and the negative DC voltage terminal.

In some embodiments, the PFC circuit comprises a PFC controller that controls a voltage difference between the positive DC voltage terminal and the negative DC voltage terminal, and wherein the PFC circuit does not include a controller that controls the voltage difference between the positive DC voltage terminal and the center DC voltage terminal.

According to one aspect of the disclosure, a controller for controlling an alternating current (AC) to direct current (DC) converter, the controller comprising one or more circuits configured to determine an indication of a voltage difference between (i) a voltage of a positive DC voltage terminal of the AC-to-DC converter relative to a center DC voltage terminal of the AC-to-DC converter and (ii) a voltage of the center DC voltage terminal of the AC-to-DC converter relative to a negative DC voltage terminal; determine, based on the indication of the voltage difference, a control signal to control a current draw from the positive DC voltage terminal or the negative DC voltage terminal by a DC-to-DC converter; and provide the control signal to the DC-to-DC converter to control the current draw from the positive DC voltage terminal or the negative DC voltage terminal by the DC-to-DC converter.

In some embodiments, to determine the control signal comprises to (i) determine, based on the indication of the voltage difference, a first control signal to control a current draw from the positive DC voltage terminal and (ii) determine, based on the indication of the voltage difference, a second control signal to control a current draw from the negative DC voltage terminal, and wherein to provide the control signal comprises to (i) provide the first control signal to the DC-to-DC converter to control the current draw from the positive DC voltage terminal and (ii) provide the second control signal to the DC-to-DC converter to control the current draw from the negative DC voltage terminal.

In some embodiments, if the indication of the voltage difference indicates that the voltage of the positive DC voltage terminal relative to the center DC voltage terminal is greater than the voltage of the center DC voltage terminal relative to the negative DC voltage terminal, the first control signal causes the current draw from the positive DC voltage terminal to decrease and the second control signal causes the current draw from the negative DC voltage terminal to increase, and if the indication of the voltage difference indicates that the voltage of the positive DC voltage terminal relative to the center DC voltage terminal is less than the voltage of the center DC voltage terminal relative to the negative DC voltage terminal, the first control signal causes the current draw from the positive DC voltage terminal to increase and the second control signal causes the current draw from the negative DC voltage terminal to decrease.

In some embodiments, to provide the control signal to the DC-to-DC converter causes the voltage difference to decrease.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
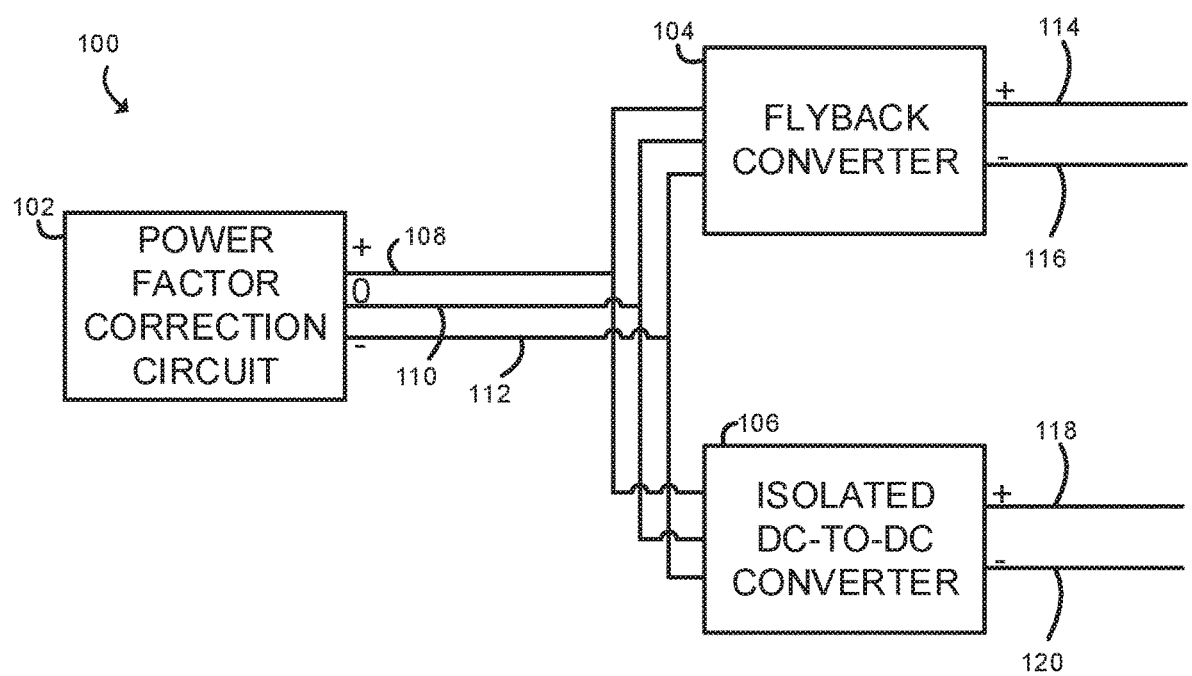
FIG. 1 is a simplified block diagram of an AC-to-DC converter.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative alternating current (AC) to direct current (DC) converter 100 includes a power factor correction (PFC) circuit 102, a flyback converter 104, and an isolated DC-to-DC converter 106. In the illustrative embodiment, the PFC circuit 102 has a three-phase power input and a split DC voltage output, with a positive DC voltage terminal 108, a center DC voltage terminal 110, and a negative DC voltage terminal 112. In the illustrative embodiment, the voltage difference between the positive DC voltage terminal 108 and the center DC voltage terminal 110 is the same the voltage difference between the negative DC voltage terminal 112 and the center DC voltage terminal 110. For example, the positive DC voltage terminal 108 may be at +400 volts, the center DC voltage terminal 110 may be at 0 volts, and the negative DC voltage terminal 112 may be at −400 volts. It should be appreciated that the center DC voltage terminal 110 is not necessarily physically disposed in the center of the PFC circuit 102. Rather, the center DC voltage terminal 110 is called "center" because it has a voltage that is between that of the positive DC voltage terminal 108 and that of the negative DC voltage terminal 112.

In use, the load between the positive DC voltage terminal 108 and the center DC voltage terminal 110 may be different from the load between the negative DC voltage terminal 112 and the center DC voltage terminal 110. The difference may be due to one terminal being loaded by additional or different components as compared to the other terminal. Even if both terminals 108, 112 are symmetrically loaded with the same components, slight differences between the components may lead to different loads on the terminals 108, 112. If the difference is not corrected, then the voltage levels may be affected, which may be undesirable in some cases. If the imbalance between the loads is corrected by changing the distribution of current in the PFC circuit 102, then there may be increase total harmonic distortion on the AC input, as discussed in more detail below in regard to FIG. 2.

To address the differences in load between the positive DC voltage terminal 108 and the negative DC voltage terminal 112, in the illustrative embodiment, the flyback converter 104 and/or the isolated DC-to-DC converter 106 is configured to draw different amounts of current from the different terminals 108, 112 to compensate for the differences in load on the terminals 108, 112. For example, if there is a higher load on the positive DC voltage terminal 108 than the negative DC voltage terminal 112, then the flyback converter 104 may draw more current from the negative DC voltage terminal 112 and less current from the positive DC voltage terminal 108 to compensate. In the illustrative embodiment, one (but not both) of the flyback converter 104 or the isolated DC-to-DC converter 106 is configured to compensate for the load imbalance on the terminals 108, 112. For example, in some embodiments, the flyback converter 104 may be expected to draw enough current to balance the load between the terminals 108, 112, and the flyback converter 104 may then be configured to balance the loads. In other embodiments, the flyback converter 104 may be expected not to draw enough current to balance the load between the terminals 108, 112, but the isolated DC-to-DC converter 106 may be expected to draw enough current to be able to balance the load between the terminals 108, 112. However, it should be appreciated that, in some embodiments, both the flyback converter 104 and the DC-to-DC converter 106 may be configured to balance the load between the terminals 108, 112.

The AC voltage and the various DC voltages of the AC-to-DC converter 100 may be any suitable voltages. For example, the AC voltage may be, e.g., 110 volts, 220 volts, 500 volts, etc. The DC voltages, such as the voltage on the positive DC voltage terminal 108, the center DC voltage terminal 110, the negative DC voltage terminal 112, the flyback converter positive DC voltage terminal 114, the flyback converter negative DC voltage terminal 116, the isolated DC-to-DC converter positive DC voltage terminal 118, or the isolated DC-to-DC converter negative DC voltage terminal 120 may be any suitable voltage, such as plus or minus 5 volts, 12 volts, 24 volts, 100 volts, 200, volts, 400, volts, etc. Similarly, the power of the AC-to-DC converter 100 may be any suitable power, such as 100 watts, 500 watts, 1 kilowatt, 5 kilowatts, 20 kilowatts, 50 kilowatts, 100 kilowatts, etc. Each of the flyback converter 104 and the isolated DC-to-DC converter 106 may provide any power independently. For example, in one embodiment, the AC-to-DC converter 100 may provide 10 kW of power and the flyback converter may provide 100 W of power.

It should be appreciated that, in some embodiments, the PFC circuit 102, the flyback converter 104, and the isolated DC-to-DC converter 106 may not be discrete components as shown in FIG. 1. Rather, the PFC circuit 102, the flyback converter 104, and/or the isolated DC-to-DC converter 106 may be, e.g., integrated into the same housing or onto the same circuit board. Additionally, in some embodiments, various components of the PFC circuit 102, the flyback converter 104, and the DC-to-DC converter 106 may be intermingled or shared in the AC-to-DC converter 100. As such, the various terminals, such as the positive DC voltage terminal 108, the center DC voltage terminal 110, the negative DC voltage terminal 112, the flyback converter positive DC voltage terminal 114, the flyback converter negative DC voltage terminal 116, the isolated DC-to-DC converter positive DC voltage terminal 118, and the isolated DC-to-DC converter negative DC voltage terminal 120 may not be embodied as a physical terminal such as a screw, connector etc., but instead may simply be a wire extending between two circuit elements.

In some embodiments the AC-to-DC converter 100 may have different components than those shown in FIG. 1. For example, the AC-to-DC converter 100 may have a flyback converter 104 and not have an isolated DC-to-DC converter 106, or the AC-to-DC converter 100 may have an isolated DC-to-DC converter 106 without a flyback converter 104. The AC-to-DC converter 100 may also have additional components, such as additional DC-to-DC converters or additional internal loads not explicitly shown. In some embodiments, the PFC circuit 102 may have more than two output voltage levels and/or the output voltage levels may vary.

Figure 2:
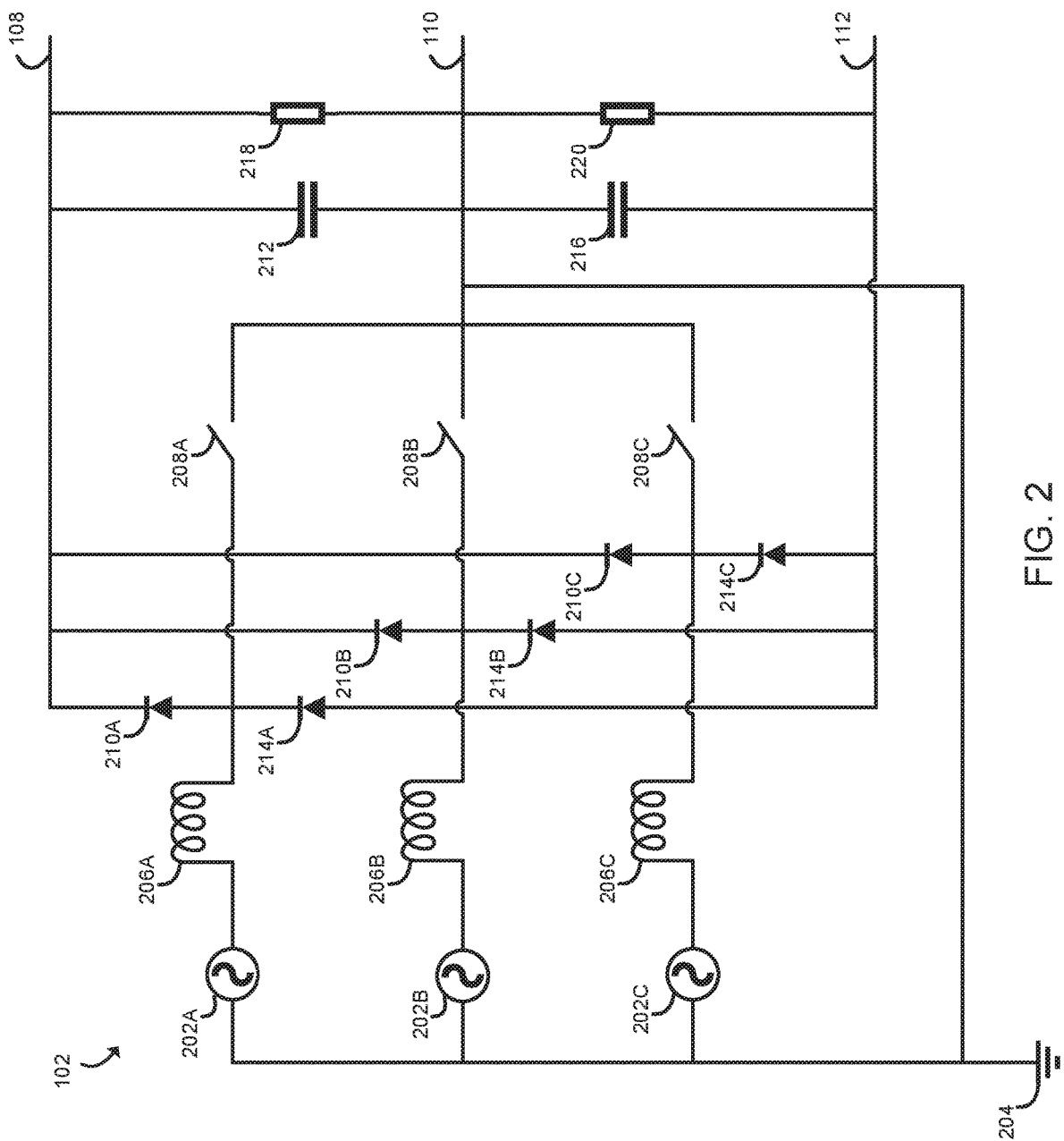
FIG. 2 is a simplified circuit diagram of at least one embodiment of the power factor correction circuit of FIG. 1.

Referring now to FIG. 2, the illustrative PFC circuit 102 has a three-phase power input with AC sources 202A, 202B, and 202C, where each AC source 202A-C is 120 degrees out of phase relative to the other two AC sources. In the illustrative embodiment, each AC source 202A-C is connected to a common neutral line and also connected to the center DC voltage terminal 110. In some embodiments, the neutral of each AC source 202A-C may be floating or may be connected to different voltage such as a different ground.

AC source 202A is connected to an inductor 206A. When switch 208A is closed, current linearly increases with time in the inductor 206A. When the voltage on the AC source 202A is positive, the current through the inductor is flowing away from the AC source 202A. When the switch 208A is then opened, the current flows from the inductor 206A through the diode 210A and into a reservoir capacitor 212. At a later time determined by a switching controller, the switch 208A can be closed again to repeat the cycle. When the voltage on the AC source 202A is negative, the current through the inductor flows towards the AC source 202A. In that case, when the switch 208A is opened, current is drawn through the diode 214A and into the reservoir capacitor 216.

Control of the switch 208A controls the average amount of current drawn from the AC source 202A, as a longer time closed corresponds to a higher average current draw. In this way, the average current draw from the AC source 202A can approximate a sinusoid in phase with the voltage, leading to a power factor close to unity. In some embodiments, a smoothing capacitor may be included between the AC source 202A and the neutral line (not shown in FIG. 2). Control of the switch 208A (and switches 208B-C) may be controlled by a controller, such as a PID and/or PWM controller (not shown in FIG. 2).

Each of AC sources 202B and 202C and corresponding inductors 206B-C, switches 208B-C, and diodes 210B-C, 214B-C operate similarly to AC source 202A and corresponding components, the description of which will not be repeated in the interest of clarity.

The PFC circuit 102 has the positive DC voltage terminal 108 connected to the reservoir capacitor 212, the center DC voltage terminal 110 connected to both reservoir capacitors 212, 216, and the negative DC voltage terminal 112 connected to the reservoir capacitor 216. The PFC circuit 102 may also have a load 218 across the reservoir capacitor 212 and/or a load 220 across the reservoir capacitor 216. Each of the loads 218, 220 may represent an external physical load connected to the PFC circuit 102 (e.g., from the flyback converter 104, the isolated DC-to-DC converter 106, and/or another external load) or an internal physical load in the PFC circuit 102. It should be appreciated that, in some embodiments, the PFC circuit 102 may not include an internal load 218, 220.

In an ideal AC-to-DC converter 100, the average charge on each reservoir capacitor 212, 216 is the same, the average current delivered to each reservoir capacitor 212, 216 by the PFC circuit 102 is the same, and the average current drawn from each reservoir capacitor 212, 216 is the same. In practice, there will always be variations in that cause unequal voltage levels in the reservoir capacitors 212, 216 and/or unequal current draws from the reservoir capacitors 212, 216. Control of the switches 208A-C could be used to compensate, such as by drawing a different amount of current when the corresponding AC source 202A-C has a positive voltage (and is supplying current to reservoir capacitor 212) than when the AC source 202 A-C has a negative voltage (and is supplying current to reservoir capacitor 214), but such an approach would cause distortion on the AC sources 202A-C. Instead, in the illustrative embodiment, the AC-to-DC converter 100 compensates for any drift in the difference between the voltage across the reservoir capacitor 212 and the voltage across the reservoir capacitor 216 using the flyback converter 104 and/or the isolated DC-to-DC converter 106, as discussed in more detail below.

Figure 3:
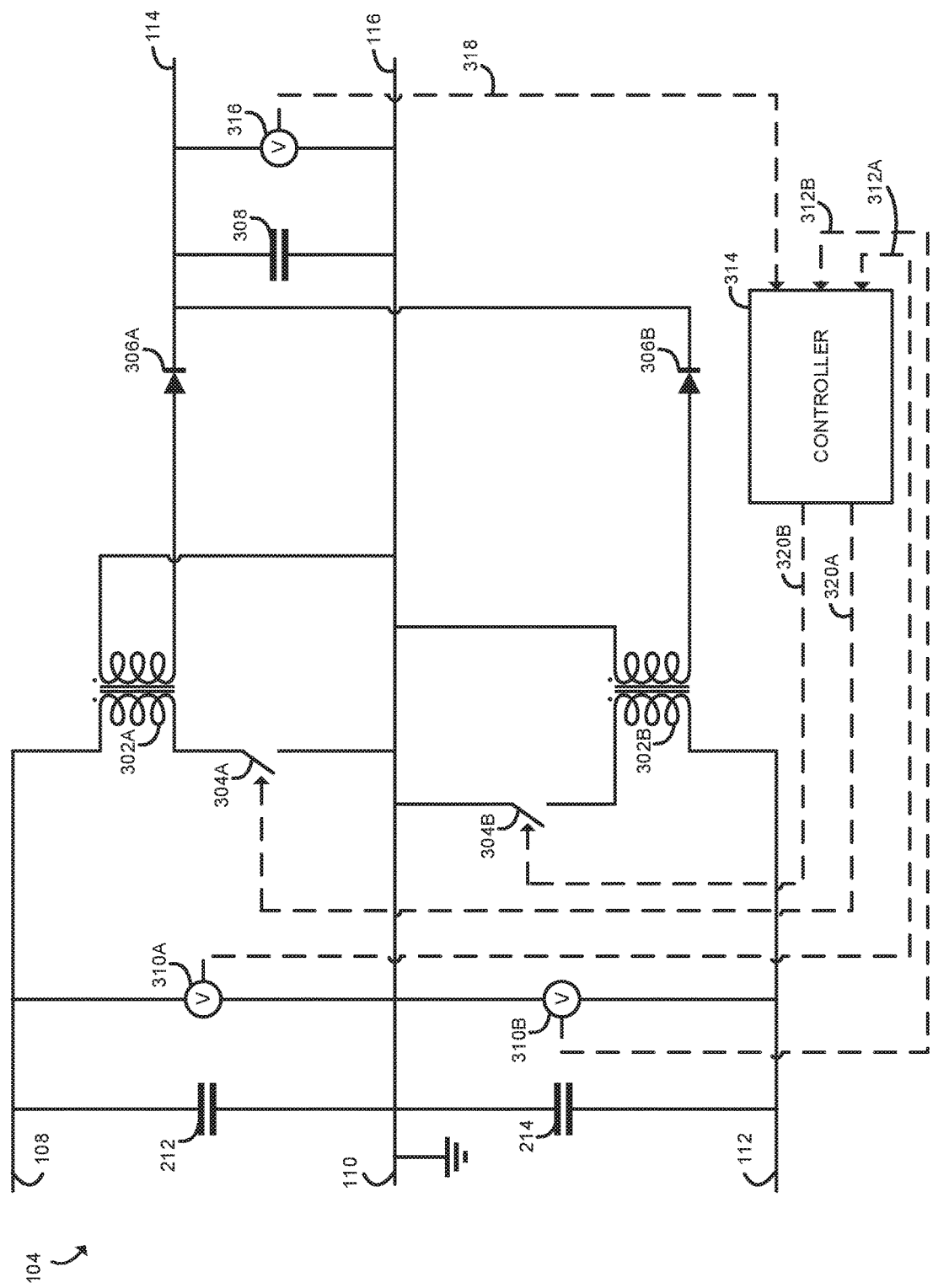
FIG. 3 is a simplified circuit diagram of at least one embodiment of the flyback converter system of FIG. 1.

Referring now to FIG. 3, the flyback converter 104 is connected to the positive DC voltage terminal 108, the center DC voltage terminal 110, and the negative DC voltage terminal 112. In use, the flyback converter 104 can draw current from the reservoir capacitor 212 through the positive DC voltage terminal 108 and can draw current from the reservoir capacitor 214 through the negative DC voltage terminal 112. In particular, the flyback converter 104 can draw current from the positive DC voltage terminal 108 through a primary side of a transformer 302A by closing the switch 304A. When the switch 304A is opened, current is drawn through the secondary side of the transformer 302A, through a diode 306A, and into a reservoir capacitor 308. Similarly, the flyback converter 104 can draw current from the negative DC voltage terminal 112 through a primary side of another transformer 302B by closing the switch 304B. When the switch 304B is opened, current is drawn through a secondary side of the transformer 302B, through the diode 306B, and into the reservoir capacitor 308. It should be appreciated that current may be drawn from the positive DC voltage terminal 108 and from the negative DC voltage terminal 112 independently and simultaneously.

The flyback converter 104 also includes a voltmeter 310A to measure the voltage across the positive DC voltage terminal 108 and the center DC voltage terminal 110 and a voltmeter 310B to measure the voltage across the center DC voltage terminal 110 and the negative DC voltage terminal 112. The voltmeter 310A provides a voltage signal 312A to a controller 314, and the voltmeter 310B provides a voltage signal 312B to the controller 314. The flyback converter 104 also includes a voltmeter 316 that measures the voltage across the flyback converter positive DC voltage terminal 114 and the flyback converter negative DC voltage terminal 116. The voltmeter 316 provides a voltage signal 318 to the controller 314.

Figure 5:
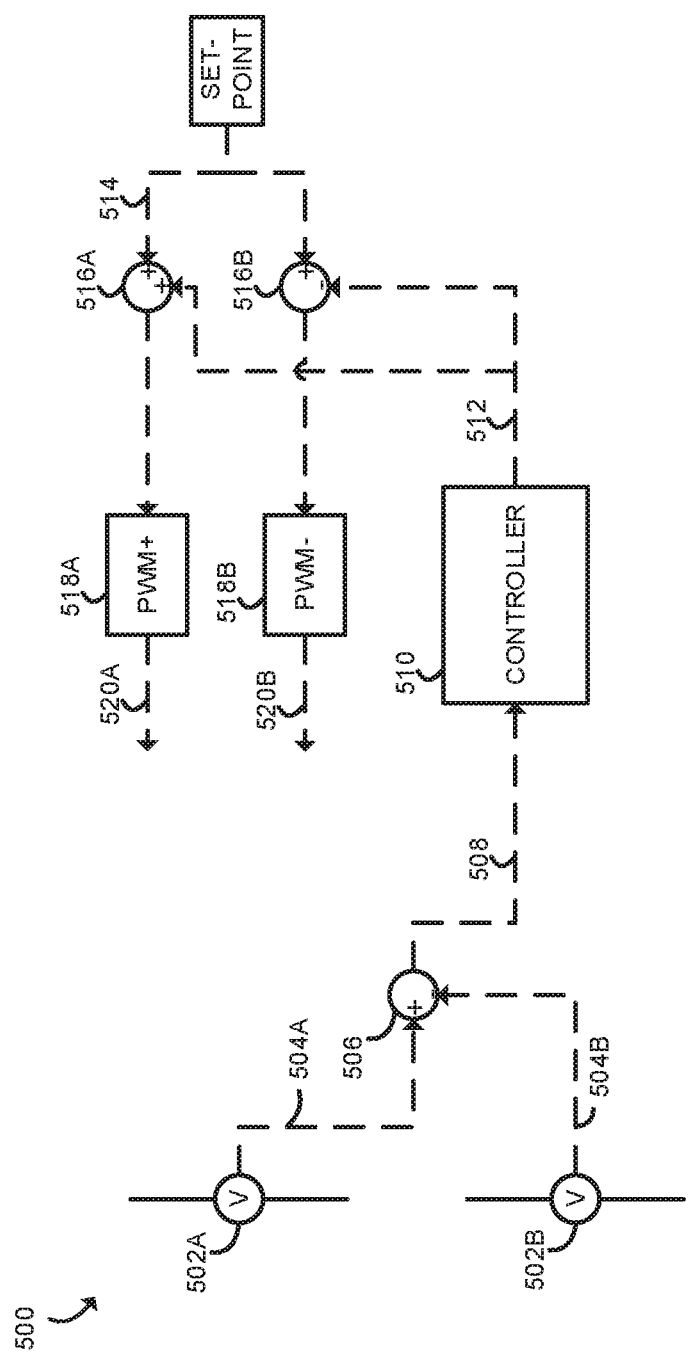
FIG. 5 is a simplified diagram of at least one embodiment of a control system of the AC-to-DC converter of FIG. 1.

The controller 314 has as inputs the voltage signals 312A, 312B, and 318. The controller 314 controls the switches 304A and 304B by providing switch control signals 320A and 320B, respectively. In the illustrative embodiment, the controller 314 controls the total current provided to the reservoir capacitor 308 by the transformers 302A-B based on the voltage signal 318 indicating the voltage across the reservoir capacitor. For example, if the voltage across the reservoir capacitor 308 is lower than a target voltage, the total current provided by the transformers 302A-B may be increased. The target voltage across the reservoir capacitor 308 may be any suitable voltage, such as 5 volts, 12 volts, 24 volts, 100 volts, 200 volts, 400 volts, etc. The controller 314 also controls how the total current provided to the reservoir capacitor 308 is split between the transformer 302A and the transformer 302B. For example, if the voltage signal 312A indicates a higher voltage difference than the voltage signal 312B, the controller 314 may control switch 304A to increase the amount of the total current that is provided by the transformer 302A and control switch 304B to decrease the amount of the total current that is provided by the transformer 302B. One example of a control circuit is shown in FIG. 5.

It should be appreciated that the particular measurement devices and signals shown in FIG. 3 to provide feedback to the controller 314 are not the only possible measurement devices and signals. The controller 314 may control the switches 304A-B based on any suitable signal, such as measuring current, voltage, or other parameter at any suitable location in the PFC circuit 102 or the flyback converter 104. The controller 314 may control the current delivered by the switches 304A-B in any suitable manner, such as by changing the duty cycle and/or period of the switches 304A-B.

In the illustrative embodiment, each of the signals 312A-B, 318, and 320A-B is carried by one or more wires extending from the controller 314 to the corresponding connected device and carrying one or more digital or analog signals. Additionally or alternatively, in some embodiments, the controller 314 may be connected to the voltmeters 310A-B, 316 and/or to the switches 304A-B in a different manner, such as one or more signals carried on a digital or analog bus, on one or more optical cables, using wireless signals, etc.

The controller 314 can be implemented as any suitable analog and/or digital circuit or collection of circuits configured to perform the function described herein. For example, the controller 314 may be embodied as or otherwise include voltage adding circuits, voltage subtracting circuits, analog-to-digital converters, digital-to-analog converters, multiplying circuits, pulse-width-modulating (PWM) circuits, analog or digital proportional-integral-differential (PID) control circuits, an embedded computing system, an application-specific integrated circuit (ASIC), a system-on-a-chip, a field-programmable gate array (FPGA), a processor-based system, etc. In some embodiments, the controller 314 may be implemented as a processor with memory, data storage, or other non-transitory machine-readable media storing a plurality of instructions that, when executed, causes the controller 314 to perform some or all of the functions described herein.

In the illustrative embodiment, the controller 314 is integrated with the flyback converter 104. Additionally or alternatively, in some embodiments, some or all of the controller 314 may be located external to the flyback converter 104 and in communication with the flyback converter 104.

Figure 4:
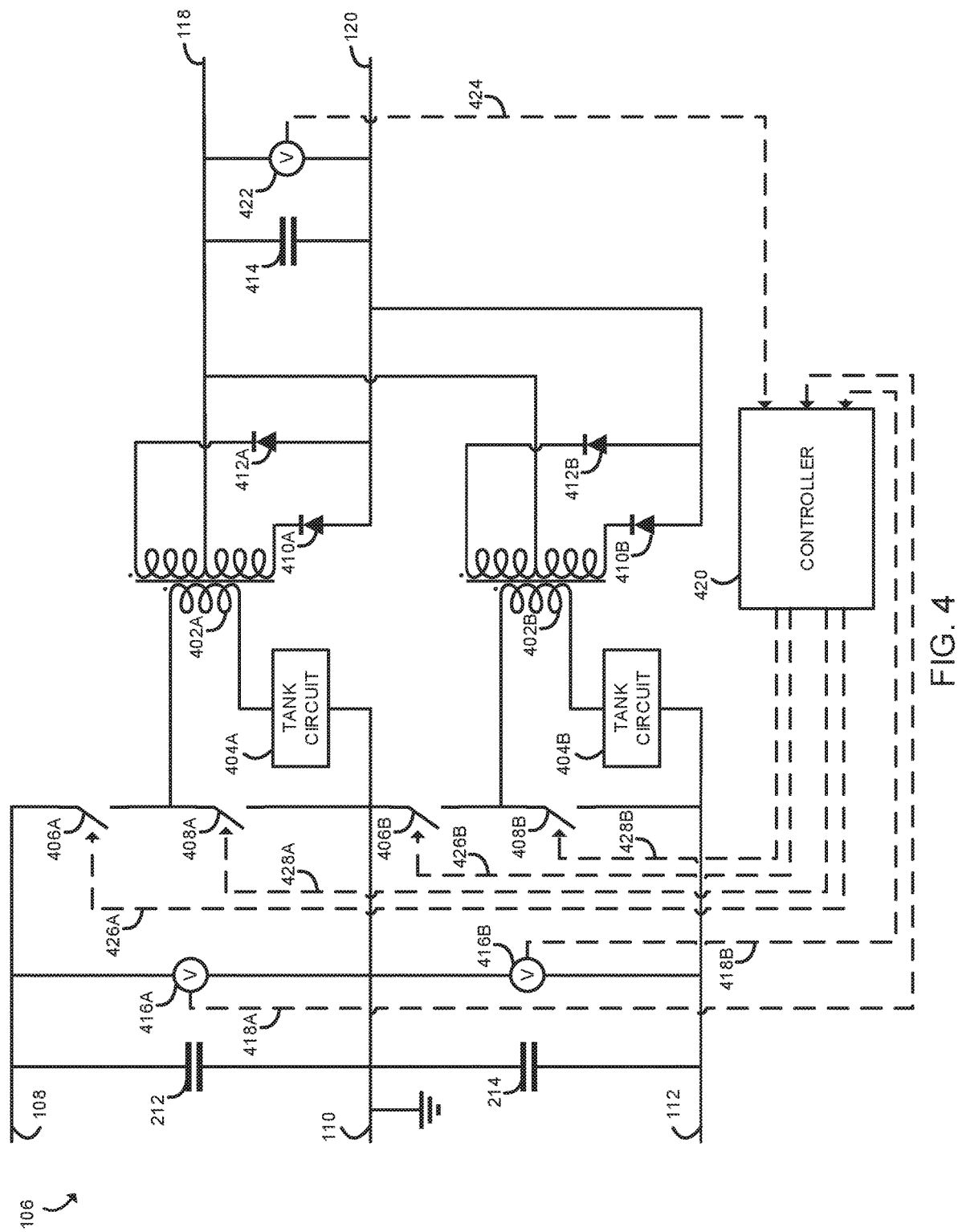
FIG. 4 is a simplified circuit diagram of at least one embodiment of the isolated DC-to-DC converter of FIG. 1.

Referring now to FIG. 4, the isolated DC-to-DC converter 106 is connected to the positive DC voltage terminal 108, the center DC voltage terminal 110, and the negative DC voltage terminal 112. In use, isolated DC-to-DC converter 106 can draw current from the reservoir capacitor 212 through the positive DC voltage terminal 108 and can draw current from the reservoir capacitor 214 through the negative DC voltage terminal 112. In particular, the isolated DC-to-DC converter 106 can draw current from the positive DC voltage terminal 108 into the transformer 402A and tank circuit 404A by alternately closing the switch 406A with switch 408A open and then closing the switch 408A with switch 406A open. In one switching cycle, when current through the transformer 402A is increasing, current is drawn through rectifier 410A into a reservoir capacitor 414. When the current through the transformer 402A decreases, current is drawn through diode 412A and into the reservoir capacitor 414. Similarly, the isolated DC-to-DC converter 106 can draw current from the negative DC voltage terminal 112 through a primary side of another transformer 402B using switches 406B and 408B. In a similar manner, energy can be stored in the transformer 402B and tank circuit 404B and transferred to the reservoir capacitor 414 through the diodes 410B, 412B.

The isolated DC-to-DC converter also includes a voltmeter 416A to measure the voltage across the positive DC voltage terminal 108 and the center DC voltage terminal 110 and a voltmeter 416B to measure the voltage across the center DC voltage terminal 110 and the negative DC voltage terminal 112. The voltmeter 416A provides a voltage signal 418A to a controller 420, and the voltmeter 416B provides a voltage signal 418B to the controller 420. The DC-to-DC converter 106 also includes a voltmeter 422 that measures the voltage across the isolated DC-to-DC converter positive DC voltage terminal 118 and the isolated DC-to-DC converter negative DC voltage terminal 120. The voltmeter 422 provides a voltage signal 424 to the controller 420.

The controller 420 has as inputs the voltage signals 418A, 418B, and 424. The controller 420 controls the switches 406A, 408A, 406B, and 408B by providing switch control signals 426A, 428A, 426B, and 428B, respectively. In the illustrative embodiment, the controller 420 controls the total current provided to the reservoir capacitor 414 by the transformers 402A-B based on the voltage signal 424 indicating the voltage across the reservoir capacitor. For example, if the voltage across the reservoir capacitor 414 is lower than a target voltage, the total current provided by the transformers 402A-B may be increased. The target voltage across the reservoir capacitor 414 may be any suitable voltage, such as 5 volts, 12 volts, 24 volts, 100 volts, 200, volts, 400, volts, etc. The controller 420 also controls how the total current provided to the reservoir capacitor 414 is split between the transformer 402A and the transformer 402B. For example, if the voltage signal 416A indicates a higher voltage difference than the voltage signal 416B, the controller 420 may control switches 406A and 408A to increase the amount of the total current that is provided by the transformer 402A and control switches 406B and 408B to decrease the amount of the total current that is provided by the transformer 402B. One example of a control circuit is shown in FIG. 5.

It should be appreciated that, as stated above in regard to the flyback converter 104 shown above in FIG. 3, the particular measurement devices and signals shown in FIG. 4 to provide feedback to the controller 420 are not the only possible measurement devices and signals. The controller 420 may control the switches 406A-B and 408A-B based on any suitable signal, such as measuring current, voltage, or other parameter at any suitable location in the PFC circuit 102 or the DC-to-DC converter 106.

The controller 420 may be implemented using any suitable analog or digital circuit or collection of circuits, similar to the controller 314 described above, which will not be repeated in the interest of clarity. Each of the signals 418A-B, 424, 426A-B, and 428A-B can be carried or delivered in a similar manner as the signals to and from the controller 314 described above, which will also not be repeated in the interest of clarity.

In the illustrative embodiment at maximum power transfer, the controller 420 modulates the switches 406A and 408A (or 406B and 408B) at a 50/50 duty cycle at a frequency near or equal to the resonant frequency of the tank circuit 404A (or 404B). To vary the transferred current, the controller 420 can change the frequency of the switching or the controller 420 can change the duty cycle of the switches.

Referring now to FIG. 5, one embodiment of a control circuit 500 is shown. Some or all of the control circuit 500 may be embodied as some or all of the controller 314 in the flyback converter 104 or the controller 420 in the isolated DC-to-DC converter 106. The control circuit 500 includes a voltmeter 502A to measure the voltage across the positive DC voltage terminal 108 and the center DC voltage terminal 110 and a voltmeter 502B to measure the voltage across the center DC voltage terminal 110 and the negative DC voltage terminal 112. A voltage signal 504B from the voltmeter 502B is subtracted from a voltage signal 504A from the voltmeter 502A at a voltage subtractor 506. The difference determined by the voltage subtractor is provided a signal 508 to a controller 510.

The controller 510 determines an error signal based on the input signal 508. The controller 510 may implement, e.g., a proportional-integral-differential (PID) controller in analog or digital circuitry with the input signal 508 as the error value of the PID controller. An output control signal 512 acts as a control variable of the PID controller. The output control signal 512 is combined with a setpoint signal 514 at a voltage adder 516A and a voltage subtractor 516B. The setpoint signal 514 may be determined in any suitable manner, such as a difference between a target voltage level and a measured voltage level of an output voltage. The output of the voltage adder 516A is provided to a pulse width modulator (PWM) 518A that controls current draw from the positive DC voltage terminal (PWM+518A). The output of the voltage subtractor 516B is provided to a PWM 518B that controls current draw from the negative DC voltage terminal (PWM-518A). Each of the PWM+518A and PWM-518B then provides one or more control signals 520A and 520B to switches that control the current draw from the positive DC voltage terminal 108 and negative DC voltage terminal 112, respectively.

It should be appreciated that the control circuit 500 is merely one possible embodiment of a circuit for controlling the switches of the flyback converter 104 or the isolated DC-to-DC converter 106. In some embodiments, a control circuit 500 may use different components, which may be implemented in any suitable analog or digital circuit or collection of circuits to perform the control function described herein.

Figure 6:
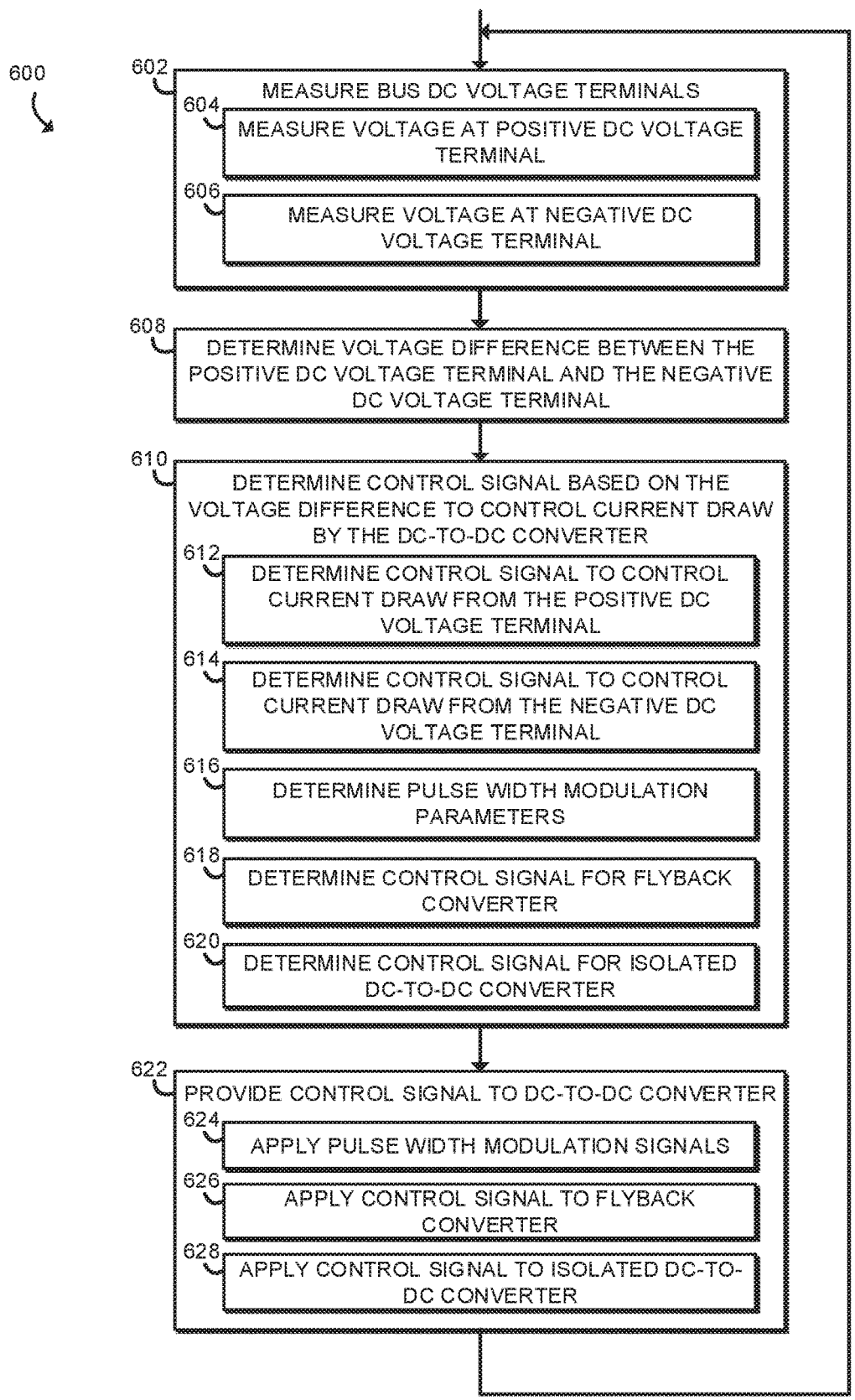
FIG. 6 is a simplified flow diagram of at least one embodiment of a method for controlling the AC-to-DC converter of FIG. 1.

Referring now to FIG. 6, in use, a controller of an AC-to-DC converter 100 may execute a method 600 for controlling the AC-to-DC converter 100. The method 600 begins in block 602, in which the controller measures bus DC voltage terminals of a PFC circuit 102. In the illustrative embodiment, the controller measures the voltage at the positive DC voltage terminal in block 604 and measures the voltage at the negative DC voltage terminal in block 606. In block 608, the controller determines a voltage difference between the positive DC voltage terminal and the negative DC voltage terminal. The controller may determine the difference by, e.g., performing a digital or analog subtraction of the measured voltage levels.

In block 610, the controller determines a control signal based on the voltage difference to control current draw in the AC-to-DC converter 100. In block 612, the controller determines a control signal to control a current draw from the positive DC voltage terminal. In block 614, the controller determines a control signal to control a current draw from a negative DC voltage terminal. In block 616, the controller determines pulse width modulation parameters, such as a duty cycle and/or a period based on the voltage difference. In block 618, the controller determines one or more control signals for the flyback converter 104. In block 620, the controller determines one or more control signals for the isolated DC-to-DC converter 106.

In block 622, the controller provides the control signal to a DC-to-DC converter, such as the flyback converter 104 or the isolated DC-to-DC converter 106. In block 624, the controller applies a PWM signal to switches in the DC-to-DC converter. In block 626, the controller applies the control signal to the flyback converter 104. In block 628, the controller applies the control signal to the isolated DC-to-DC converter 106. The method 600 then loops back to block 602 to measure the DC voltage terminals of the PFC circuit 102.

The invention claimed is:

1. An alternating current (AC) to direct current (DC) converter comprising:
    a power factor correction (PFC) circuit comprising a positive DC voltage terminal, a center DC voltage terminal, and a negative DC voltage terminal;
    a DC-to-DC converter; and
    a controller configured to:
        measure a voltage difference between (i) a voltage of the positive DC voltage terminal relative to the center DC voltage terminal and (ii) a voltage of the center DC voltage terminal relative to the negative DC voltage terminal;
        determine whether a magnitude of the voltage difference is nonzero;
        in response to determining that the magnitude of the voltage difference is nonzero, generate a control signal to control a current draw from the positive DC voltage terminal or the negative DC voltage terminal by the DC-to-DC converter; and
        provide the control signal to the DC-to-DC converter to control the current draw from the positive DC voltage terminal or the negative DC voltage terminal by the DC-to-DC converter.

2. The AC-to-DC converter of claim 1, wherein to determine the control signal comprises to (i) determine, based on the measured voltage difference, a first control signal to control a current draw from the positive DC voltage terminal and (ii) determine, based on the measured voltage difference, a second control signal to control a current draw from the negative DC voltage terminal, and wherein to provide the control signal comprises to (i) provide the first control signal to the DC-to-DC converter to control the current draw from the positive DC voltage terminal and (ii) provide the second control signal to the DC-to-DC converter to control the current draw from the negative DC voltage terminal.

3. The AC-to-DC converter of claim 2, wherein:
    if the measured voltage difference indicates that the voltage of the positive DC voltage terminal relative to the center DC voltage terminal is greater than the voltage of the center DC voltage terminal relative to the negative DC voltage terminal, the first control signal causes the current draw from the positive DC voltage terminal to decrease and the second control signal causes the current draw from the negative DC voltage terminal to increase, and
    if the measured voltage difference indicates that the voltage of the positive DC voltage terminal relative to the center DC voltage terminal is less than the voltage of the center DC voltage terminal relative to the negative DC voltage terminal, the first control signal causes the current draw from the positive DC voltage terminal to increase and the second control signal causes the current draw from the negative DC voltage terminal to decrease.

4. The AC-to-DC converter of claim 1, wherein the DC-to-DC converter comprises a flyback converter.

5. The AC-to-DC converter of claim 1, wherein the DC-to-DC converter comprises an isolated DC-to-DC converter.

6. The AC-to-DC converter of claim 1, wherein to determine the control signal comprises to determine the control signal with use of a proportional-integral-derivative (PID) controller.

7. The AC-to-DC converter of claim 1, wherein to provide the control signal to the DC-to-DC converter causes the voltage difference to decrease.

8. The AC-to-DC converter of claim 1, wherein an AC input to the AC-to-DC converter is a three-phase AC input.

9. The AC-to-DC converter of claim 1, wherein the PFC circuit further comprises a controller to control a voltage difference between the positive DC voltage terminal and the negative DC voltage terminal, and wherein the PFC circuit does not include a controller to control a voltage difference between the positive DC voltage terminal and the center DC voltage terminal.

10. A method for controlling an alternating current (AC) to direct current (DC) converter, the method comprising:
  measuring, by a controller of the AC-to-DC converter, a voltage difference between (i) a voltage of a positive DC voltage terminal of the AC-to-DC converter relative to a center DC voltage terminal of the AC-to-DC converter and (ii) a voltage of the center DC voltage terminal relative to a negative DC voltage terminal of the AC-to-DC converter;
  determining whether a magnitude of the voltage difference is nonzero;
  in response to determining that the magnitude of the voltage difference is nonzero, generating a control signal to control a current draw from the positive DC voltage terminal or the negative DC voltage terminal by a DC-to-DC converter; and
  providing, by the controller, the control signal to the DC-to-DC converter to control the current draw from the positive DC voltage terminal or the negative DC voltage terminal by the DC-to-DC converter.

11. The method of claim 10, wherein determining the control signal comprises (i) determining, by the controller and based on the measured voltage difference, a first control signal to control a current draw from the positive DC voltage terminal and (ii) determining, by the controller and based on the measured voltage difference, a second control signal to control a current draw from the negative DC voltage terminal, and wherein providing the control signal comprises (i) providing, by the controller, the first control signal to the DC-to-DC converter to control the current draw from the positive DC voltage terminal and (ii) providing, by the controller, the second control signal to the DC-to-DC converter to control the current draw from the negative DC voltage terminal.

12. The method of claim 11, wherein:
  if the measured voltage difference indicates that the voltage of the positive DC voltage terminal relative to the center DC voltage terminal is greater than the voltage of the center DC voltage terminal relative to the negative DC voltage terminal, the first control signal causes the current draw from the positive DC voltage terminal to decrease and the second control signal causes the current draw from the negative DC voltage terminal to increase, and
  if the measured voltage difference indicates that the voltage of the positive DC voltage terminal relative to the center DC voltage terminal is less than the voltage of the center DC voltage terminal relative to the negative DC voltage terminal, the first control signal causes the current draw from the positive DC voltage terminal to increase and the second control signal causes the current draw from the negative DC voltage terminal to decrease.

13. The method of claim 10, wherein determining the control signal comprises determining the control signal with use of a proportional-integral-derivative (PID) controller.

14. The method of claim 10, wherein providing the control signal to the DC-to-DC converter causes the voltage difference to decrease.

15. The method of claim 10, wherein the AC-to-DC converter comprises a power factor correction (PFC) circuit, and wherein the PFC circuit comprises the positive DC voltage terminal, the center DC voltage terminal, and the negative DC voltage terminal.

16. The method of claim 15, wherein the PFC circuit comprises a controller that controls a voltage difference between the positive DC voltage terminal and the negative DC voltage terminal, and wherein the PFC circuit does not include a controller that controls the voltage difference between the positive DC voltage terminal and the center DC voltage terminal.

17. A controller for controlling an alternating current (AC) to direct current (DC) converter, the controller comprising one or more circuits configured to:
  measure a voltage difference between (i) a voltage of a positive DC voltage terminal of the AC-to-DC converter relative to a center DC voltage terminal of the AC-to-DC converter and (ii) a voltage of the center DC voltage terminal of the AC-to-DC converter relative to a negative DC voltage terminal;
  determine whether a magnitude of the voltage difference is nonzero;
  in response to determining that the magnitude of the voltage difference is nonzero, generate a control signal to control a current draw from the positive DC voltage terminal or the negative DC voltage terminal by a DC-to-DC converter; and
  provide the control signal to the DC-to-DC converter to control the current draw from the positive DC voltage terminal or the negative DC voltage terminal by the DC-to-DC converter.

18. The controller of claim 17, wherein to determine the control signal comprises to (i) determine, based on the measured voltage difference, a first control signal to control a current draw from the positive DC voltage terminal and (ii) determine, based on the measured voltage difference, a second control signal to control a current draw from the negative DC voltage terminal, and wherein to provide the control signal comprises to (i) provide the first control signal to the DC-to-DC converter to control the current draw from the positive DC voltage terminal and (ii) provide the second control signal to the DC-to-DC converter to control the current draw from the negative DC voltage terminal.

19. The controller of claim 18, wherein:
  if the measured voltage difference indicates that the voltage of the positive DC voltage terminal relative to the center DC voltage terminal is greater than the voltage of the center DC voltage terminal relative to the negative DC voltage terminal, the first control signal causes the current draw from the positive DC voltage terminal to decrease and the second control signal causes the current draw from the negative DC voltage terminal to increase, and
  if the measured voltage difference of the voltage difference indicates that the voltage of the positive DC voltage terminal relative to the center DC voltage terminal is less than the voltage of the center DC voltage terminal relative to the negative DC voltage terminal, the first control signal causes the current draw from the positive DC voltage terminal to increase and the second control signal causes the current draw from the negative DC voltage terminal to decrease.

20. The controller of claim 17, wherein to provide the control signal to the DC-to-DC converter causes the voltage difference to decrease.

* * * * *